US011476968B2

(12) United States Patent
Fernandez Duran et al.

(10) Patent No.: US 11,476,968 B2
(45) Date of Patent: Oct. 18, 2022

(54) OPTICAL LINE CONTROLLER SYSTEM FOR CONTROLLING A PASSIVE OPTICAL NETWORK

(71) Applicant: Nokia Solutions and Networks Oy, Espoo (FI)

(72) Inventors: Alfonso Fernandez Duran, Madrid (ES); Tomas Sanjuan Flores, Madrid (ES)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/744,745

(22) Filed: Jan. 16, 2020

(65) Prior Publication Data

US 2020/0235841 A1 Jul. 23, 2020

(30) Foreign Application Priority Data

Jan. 23, 2019 (EP) .................................... 19153271

(51) Int. Cl.
*H04J 14/00* (2006.01)
*H04J 14/02* (2006.01)
*H04B 10/40* (2013.01)

(52) U.S. Cl.
CPC .......... *H04J 14/0232* (2013.01); *H04B 10/40* (2013.01)

(58) Field of Classification Search
CPC ...... H04J 14/0232; H04J 14/023; H04B 10/40
See application file for complete search history.

(56) References Cited

U.S. PATENT DOCUMENTS

| 6,072,618 A * | 6/2000 | Takenaka | H01S 5/0683 |
| | | | 359/239 |
| 6,445,369 B1 * | 9/2002 | Yang | G06F 3/147 |
| | | | 345/39 |
| 8,660,437 B1 * | 2/2014 | Blauvelt | H04B 10/506 |
| | | | 398/196 |
| 2006/0120727 A1 * | 6/2006 | Lee | H04J 14/0252 |
| | | | 398/135 |

(Continued)

FOREIGN PATENT DOCUMENTS

| CN | 102771066 A | | 11/2012 |
| GB | 2294372 | * | 4/1996 |
| WO | WO-2010/107350 A1 | | 9/2010 |

OTHER PUBLICATIONS

Zhang Zhiguo et al: "Colorless-Light and Tunable-Light-Source Schemes for TWDM and WDM PONs", IEEE Communications Magazine, IEEE Service Center, Piscataway, US, vol. 56, No. 8, Aug. 1, 2018 (Aug. 1, 2018), pp. 120-128.

(Continued)

*Primary Examiner* — David C Payne
*Assistant Examiner* — Pranesh K Barua
(74) *Attorney, Agent, or Firm* — Harness, Dickey & Pierce, P.L.C.

(57) ABSTRACT

Controller circuitry configured to control an optical transceiver of an optical line terminal, OLT, in a passive optical network, PON. The controller circuitry configured to derive a level of optical beat interference, OBI, of a received upstream optical signal from an optical transceiver of an optical network terminal, ONT; and set a wavelength of a downstream optical signal based on the level of OBI such that the wavelength is forced to differ from the upstream optical signal wavelength.

12 Claims, 8 Drawing Sheets

(56) References Cited

U.S. PATENT DOCUMENTS

| | | | | |
|---|---|---|---|---|
| 2006/0127092 A1* | 6/2006 | Jang | ............... | H04B 10/077 398/70 |
| 2006/0133805 A1* | 6/2006 | Jang | ............... | H04B 10/0799 398/26 |
| 2007/0258713 A1* | 11/2007 | Jung | ............... | H04J 14/0226 398/71 |
| 2008/0085118 A1* | 4/2008 | Effenberger | ............... | H04J 14/0282 398/82 |
| 2009/0097856 A1* | 4/2009 | Sasai | ............... | H04B 10/1141 398/119 |
| 2012/0308237 A1* | 12/2012 | Mutalik | ............... | H04J 14/0247 398/116 |
| 2013/0302029 A1* | 11/2013 | Lee | ............... | H04J 14/025 398/25 |
| 2015/0304744 A1* | 10/2015 | Maricevic | ............... | H04J 14/0221 398/67 |
| 2016/0204875 A1* | 7/2016 | Araki | ............... | H04B 10/572 398/34 |
| 2017/0149501 A1* | 5/2017 | Al-Banna | ............... | H04B 10/07953 |
| 2017/0222727 A1* | 8/2017 | Binkai | ............... | H04B 10/506 |
| 2017/0302399 A1* | 10/2017 | Yin | ............... | H04B 10/2581 |

OTHER PUBLICATIONS

Zhang Zhiguo et al: "40-Gb/s downstream and 10-Gb/s upstream long-reach WDM-PON employing remotely pumped EDFA and self wavelength managed tunable transmitter", 9th International Conference on Communications and Networking in China, IEEE, Aug. 14, 2014 (Aug. 14, 2014), pp. 280-283.

European Search Report for European Patent Application No. 19153271 dated Jul. 11, 2019.

S. Soerensen et al. "Optical Beat Noise Suppression and Power Equalization in Subcarrier Multiple Access Passive Optical Networks by Downstream Feedback" Journal of Lightwave Technology, vol. 18, No. 10, Oct. 2000, p. 1337-1347.

Communication pursuant to Article 94(3) dated Feb. 7, 2022 in European Patent Application No. 19153271.

First Office Action dated Aug. 3, 2022 in Chinese Application No. 202010060121.0.

* cited by examiner

OPTICAL LINE CONTROLLER SYSTEM FOR CONTROLLING A PASSIVE OPTICAL NETWORK

CROSS-REFERENCE TO RELATED APPLICATIONS

This application claims priority under 35 U.S.C. § 120 to EP Application No. 19153271.2, filed Jan. 23, 2019, the entire contents of which are hereby incorporated by reference.

TECHNICAL FIELD

Various example embodiments relate to the controlling of signals transmitted in a passive optical network.

BACKGROUND

A passive optical network, PON, is a telecommunications technology for providing fiber to end consumers. A PON comprises commonly a point-to-multipoint set-up whereby unpowered fiber optic splitters are used to provide a single optical fiber to serve multiple end-points.

A PON further comprises an optical line terminal, OLT, which serves as the service provider endpoint, and a number of optical network terminals, ONTs, near end users.

A PON using a gigabit passive optical network, GPON, is able to provide a bitrate of 2.5 Gbps, thereby providing subscriber rates from 30 Mbps to 600 mbps. In other standards, such as XGSPON and 10GEPON, higher bitrates per wavelength are offered thereby providing bitrate speeds up to 10 Gbps. In a NGPON2 variant several 10 Gbps wavelengths are multiplexed thereby delivering 40 Gbps in the same optical fiber.

SUMMARY

The higher the optical bitrate, the more expensive optical components need to be used. These components are, among others, the transmitting laser and the receiving photodiode. Further, to support bidirectionality, PON systems use two different wavelengths for transmitting and receiving respectively.

To support bidirectionality by simultaneous transmission and reception in a single wavelength, an isolation between transmitting and receiving paths is provided at each end of the fiber. This isolation is achieved using optical circulators. Optical circulators nevertheless do not provide a perfect isolation and a leakage from a transmitting port to an undesired receiving port occurs. This increases a noise in the PON thereby significantly reducing the performance thereof.

Amongst others, it is an object of embodiments of the present disclosure to provide a solution that improves the supporting of bidirectional transmitting and receiving signals in a PON.

This object is achieved, according to a first example aspect of the present disclosure, by a controller circuitry as defined by claim 1, for controlling an optical transceiver of an optical line terminal, OLT, in a passive optical network, PON, comprising means for performing:

deriving a level of optical beat interference, OBI, of a received upstream optical signal from an optical transceiver of an optical network terminal, ONT; and setting a wavelength of a downstream optical signal based on the level of OBI such that the wavelength is forced to differ from the upstream optical signal wavelength.

The optical transceivers of the OLT and the ONT are configured to simultaneously exchange signals in the PON. The optical transceivers comprise each an optical transmitter and optical receiver, such as for example a laser and a photodiode, whereby through in-band full duplex, this is the simultaneous exchange from and to the OLT and from and to the ONT, the bandwidth is doubled per wavelength.

When transmitting and receiving the optical signals, the signals pass through optical circulators which exhibit undesired optical leakage. This leakage may further be combined with reflections of transmitted signals when they cross splitters in the PON. Furthermore, discontinuities may be present in the PON as well, which may be crossed by the optical signals before they reach the far end. These phenomena produce the OBI effect at the receiving photodiode of an optical transceiver.

More specifically, the OBI effect originates from the detection process of the optical receiver such as a receiving photodiode, i.e. the opto-electrical conversion, having an inherent quadratic function. The quadratic function output comprises the desired signal combined with an electrical signal with a frequency equal to the frequency difference of the two optical signals present at the receiving photodiode. If transmitters at both ends of the PON use a same wavelength, or wavelengths close to each other, for example when the frequency difference between the two optical signals is lower than the data bandwidth, the OBI results in a significant performance degradation.

The level of OBI at a photodiode of the optical transceiver from the OLT is derived. This may be performed by monitoring a signal received at the optical receivers such as a photodiode. The signal is a received upstream optical signal, whereby upstream means that the stream originates from the ONT in the PON towards the OLT.

Next, based on the derived level of OBI, a laser of the optical transceiver of the OLT is controlled by setting the wavelength of its transmitting signals. This wavelength is set based on the derived level of OBI such that the wavelength is forced to differ from the wavelength of the upstream optical signal. In other words, the downstream optical signal, thus from the OLT towards the ONT, comprises a wavelength which will be different from the wavelength of the upstream optical signal, whereby the difference is based on the level of OBI.

Different advantages are identified. Firstly, there is no need for composing or producing additional signals for injecting in the PON, for example controlling signals, which could aversely influence the functioning of the PON. Characteristics of existing signals, and in particular the level of OBI therefrom, may be used directly as a parameter to control the PON.

Secondly, by forcing the wavelengths to differ from each other, the level of OBI will be reduced by the low pass filtering effect of the channel. At a random spectral location of receiving and transmitting lasers of an optical transceiver that are very close to each other, the OBI is produced since the detecting optical receiver or photodiode is performing an equivalent quadratic function. This quadratic function causes a beat of the optical signals yielding an electrical component that relates to the wavelength difference between the wavelengths of the received upstream optical signal and the sent downstream optical signal. The closer the two wavelengths, the higher the impact of OBI produced.

Thus, thirdly, by using the existing signal in the PON and deriving therefrom the level of OBI, combined with the use of the level of OBI itself to reduce it through pushing the wavelengths such that they differ, the effect is reduced based on a measurement therefrom. In other words, there is a direct link between the interference that may be present in the PON and the way that it is reduced. The reduction means that it is either eliminated, either significantly reduced.

Fourthly, optical in-band full duplex is performed by the existing components of the optical system. This is achieved by doubling the bandwidth per wavelength using the normal bandwidth of the optical devices. There is thus no need on increasing the bandwidth of the transceiver, for example lasers and photodiodes, which would lead to a significant increase in costs of the components.

Fifthly, since these components, like transmitting and receiving lasers, operate in their respective wavelength with a certain degree of tolerance, the forcing of the difference between the wavelengths is achieved by letting the laser operate at both ends within their tolerance margins, although opposite to each other. This way, they still operate around their respective nominal wavelength, but such a difference is enough to shift the OBI totally or partially outside the received interest spectrum.

According to example embodiments, the means are further configured to perform:
obtaining a monitored signal indicative for the received upstream optical signal; and wherein the deriving of the level of OBI is performed by the steps of:
amplifying the monitored signal thereby obtaining an amplified signal; and
filtering the amplified signal thereby obtaining a filtered signal;
enveloping the filtered signal thereby obtaining an enveloped signal; and
integrating the enveloped signal thereby obtaining an integrated signal; and whereby the integrated signal is indicative for the level of OBI.

To derive the level of OBI of the received upstream optical signal, the means may be configured as follows.

Firstly, a monitored signal indicative for the received upstream optical signal is obtained. For example, at the receiving photodiode of the optical transceiver of the OLT, an electrical signal representative for the received upstream optical signal is measured and nominated as the monitored signal.

Next, by amplifying the monitored signal, for example by a transconductance amplifier, an amplified signal is obtained. This amplified signal is filtered, for example by a high-pass filter. This way most of the OBI signal is taken or identified from the amplified signal. Then an electrical envelope detector detects an envelope of the filtered signal as the enveloped signal and this enveloped signal is integrated by an integrator or, alternatively, by a low pass filter to remove any carrier frequency from the OBI electrical signal. As a result, an integrated signal is obtained that represents only the power of energy level of the OBI signal. This integrated signal is then representative or indicative of the level of OBI. In other words, the amount of OBI energy present in the PON is determined.

Subsequently, the integrated signal is used to set the wavelength of the downstream optical signal. The setting is, for example, performed by controlling a laser bias the produces a shift in wavelengths. In other words, a control loop at the OLT arises. This control loop can be implemented at the infrastructure side, this is without a need of intervening at the ONT side.

According to example embodiments, the means are further configured to perform:
instructing a transmitting laser of the optical transceiver of the OLT to produce an initializing optical signal configured to instruct the optical transceiver of the ONT to send in reply a responding optical signal;
and wherein the monitored signal is the responding optical signal.

The control loop can either operate through continuous tracking thereby continuously adjusting and setting the wavelength such that the level of OBI is reduced. Alternatively, at start-up, this is before data is transmitted in the PON, the means are configured to instruct the optical transceiver at the OLT to produce an initializing optical signal. The initializing optical signal is, for example, a continuous optical wave configured to instruct the ONT to send in reply a responding optical signal. The responding optical signal may also be a continuous optical wave. This way the control loop may be initiated whereby the responding optical signal from the ONT serves as the monitored signal for the loop.

According to example embodiments, the initializing optical signal is further configured to instruct a plurality of optical transceivers of ONTs to sequentially send in reply a respective responding optical signal; and wherein the deriving further comprises deriving the level of OBI based on a maximum value of the respective responding optical signals.

In the occurrence that the OLT serves a plurality of ONTs, for example through an optical splitter, the initialization process is performed by transmitting the initializing optical signal to the ONTs. The initializing optical signal is then further configured such that the ONTs each sequentially reply by sending a respective responding signal.

From the sequentially received responding optical signals from the ONTs, the controller circuitry derives the level of OBI based on the maximum value among the respective responding optical signals. This way, the control loop adapts itself to a worst-case scenario, this is, to a highest level of OBI that may be present in the PON originating from an ONT that transmits a strongest signal from a power level point of view.

According to example embodiments, the initializing optical signal is further configured to instruct a plurality of optical transceivers of ONTs to sequentially send a respective responding optical signal in reply; and wherein the deriving further comprises sequentially deriving the level of OBI for the respective responding optical signals; and where the means are further configured to perform:
storing for the plurality of ONTs the respective level of OBI.

Alternatively, the circuitry may derive the level of OBI for each of the replying ONTs. These levels are then stored such that an overview is obtained of the whole PON with each of the ONTs and related level of OBI. The storing may, for example, be stored in a bias table, whereby the storing media is either incorporated in the circuitry, or accessible through exchanging means by the circuitry.

According to example embodiments, the means are further configured to perform:
identifying an ONT as addressee and based thereon selecting the corresponding stored level of OBI;
and wherein the setting is based on the selected level of OBI.

In other words, when the OLT start communicating with one of the ONTs, the ONT is identified such that the circuitry can adapt the setting of the wavelength for exchanging data between the OLT and the ONT as addressee based on the expected level of OBI. This way, the presence of OBI is reduced or eliminated prior to the exchange of data such that this may be performed efficiently.

According to example embodiments, the means are further configured to:

instructing a laser bias configured to control a transmitting laser for producing the downstream optical signal at the optical transceiver of the OLT; and wherein the setting further comprises instructing the laser bias.

The transmitting laser of the optical transceiver of the OLT may be controlled by a laser bias. The control loop, and in particular the integrated signal thereof, then instructs the laser bias to shift the wavelength of the transmitting laser such that it differs from the wavelength of the monitored received upstream optical signal.

At an initialization phase, the laser bias may, for example, be set at a maximum or minimum position, and during tracking gradually be adapted if needed.

According to a second aspect, an OLT is disclosed comprising a controller circuitry according to the first aspect.

In other words, the controller circuity for controlling the OLT may be incorporated in the OLT itself. This way, the OLT comprises the functionality to control the wavelengths of the optical transceiver such that it may operate in an efficient manner, without a need to implement the circuitry afterwards.

According to an embodiment, the OLT comprises a laser bias configured to control a transmitting laser for producing a downstream optical signal at the optical transceiver of the OLT; and the controller circuitry is further configured to perform the instructing of the laser bias according to the first aspect.

According to a third aspect, a method is disclosed comprising the steps of:

deriving a level of optical beat interference, OBI, of a received upstream optical signal from an optical transceiver of an optical network terminal, ONT; and setting a wavelength of a downstream optical signal based on the level of OBI such that the wavelength is forced to differ from the upstream optical signal wavelength.

According to an embodiment, the method further comprises the steps of:

obtaining a monitored signal indicative for the received upstream optical signal; and wherein the deriving of the level of OBI is performed by the steps of:

amplifying the monitored signal thereby obtaining an amplified signal; and filtering the amplified signal thereby obtaining a filtered signal;

enveloping the filtered signal thereby obtaining an enveloped signal; and integrating the enveloped signal thereby obtaining an integrated signal; and whereby the integrated signal is indicative for the level of OBI.

According to a fourth aspect, a computer program product is disclosed comprising computer-executable instructions for performing the following steps when the program is run on a computer:

deriving a level of optical beat interference, OBI, of a received upstream optical signal from an optical transceiver of an optical network terminal, ONT; and setting a wavelength of a downstream optical signal based on the level of OBI such that the wavelength is forced to differ from the upstream optical signal wavelength.

According to a fifth aspect, computer readable storage medium comprising computer-executable instructions for performing the following steps when the program is run on a computer:

deriving a level of optical beat interference, OBI, of a received upstream optical signal from an optical transceiver of an optical network terminal, ONT; and setting a wavelength of a downstream optical signal based on the level of OBI such that the wavelength is forced to differ from the upstream optical signal wavelength.

BRIEF DESCRIPTION OF THE DRAWINGS

Some example embodiments will now be described with reference to the accompanying drawings.

DETAILED DESCRIPTION OF EMBODIMENT(S)

Figure 1:
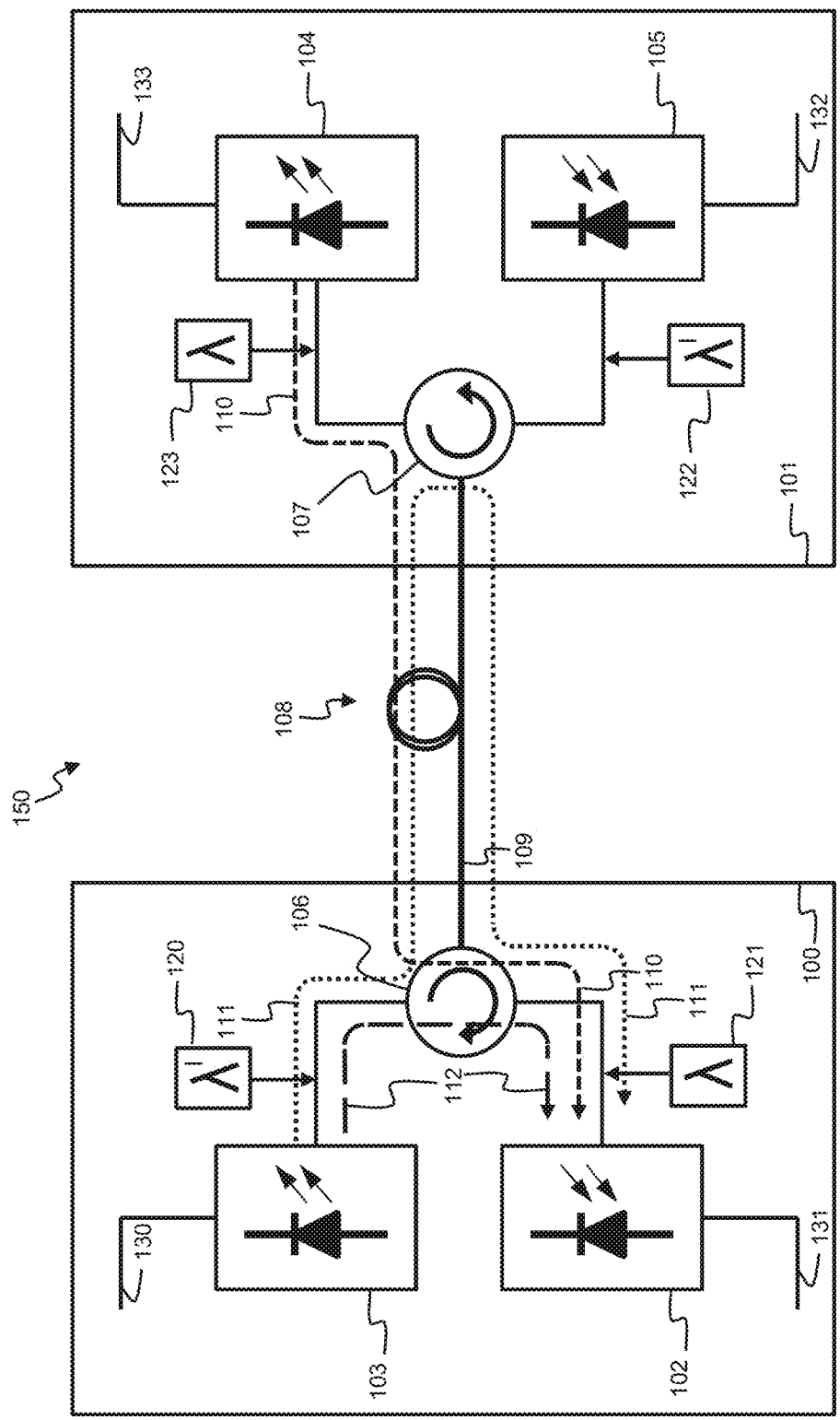
FIG. 1 shows an example embodiment of a passive optical network comprising an optical line terminal and an optical network terminal.

In FIG. 1 an example embodiment of a passive optical network (PON) 150 is illustrated. The PON 150 comprises an optical line terminal (OLT) 100 and an optical network terminal (ONT) 101. The OLT 100 and ONT 101 are configured such that they can mutually exchange data over a fiber 109. The optical fiber 109 can comprise several kilometres, illustrated by loop 108. The ONT 101 is further configured to serve an end-user, and whereby the OLT 100 is considered as the infrastructure side of the PON 150.

Between the OLT 100 and the ONT 101 data is exchanged using optical signals. For this end, both the OLT 100 and ONT 101 comprise each an optical transceiver. An optical transceiver further comprises a transmitting laser and a receiving photodiode. As for the OLT 100 the transmitting laser is laser 103 and the receiving photodiode is diode 102. As for the ONT 101 the transmitting laser is laser 104 and the receiving photodiode is diode 105.

A signal produced by the laser 103 of the OLT 100 and transmitted to the ONT 101 is nominated as a downstream optical signal, while a signal produced by the laser 104 of the ONT 101 and transmitted to the OLT 100 is nominated as an upstream optical signal. Further, the downstream optical signal comprises a wavelength $\lambda'$ 120, while the upstream optical signal comprises a wavelength $\lambda$ 123. The photodiode 102 is configured to receive the upstream optical wavelength with wavelength λ 121, while the photodiode 105 is configured to receive the downstream optical signal with wavelength λ' 122.

The different components of the optical transceivers may further be connected by an electrical cable whereby the data exchanged by the optical signal can be transformed into an electrical signal. For example, laser 103 is connected through wire 130, photodiode 102 is connected through wire 131, laser 104 is connected through wire 133, and photodiode 105 is connected through wire 132.

The PON 150 is further configured to bidirectional and simultaneous exchange optical signals between the OLT 100 and the ONT 101. In particular, the simultaneous transmission and reception is performed in a single wavelength, this is optical in-band full duplex, by isolating the transmitting and receiving path through the use of optical circulators. For the OLT 100 this is optical circulator 106, and for the ONT 101 this is the optical circulator 107. Thus, as an example, the optical signal 110 produced at the laser 104 is deviated by the optical circulator 107 to the optical fiber 109 and further by the optical circulator 106 deviated to the photodiode 102.

In real-life situations, the optical circulators, however, don't provide perfect isolation and optical leakage occurs. Because of such a leakage, one transmitting port to another undesired transmitting port occurs. This is illustrated by optical signal 112 produced by laser 103 from which a part is deviated via optical circulator 106 to the photodiode 102. Furthermore, additionally to the leakage, reflections may occur when the signal crosses splitter, other discontinuities in the fiber 109 and/or at the optical circulators. This phenomenon is illustrated by produced optical signal 111 at the laser 103 which is reflected by the optical circulator 107 and further deviated to photodiode 102 by optical circulator 106.

Thus, at the photodiode 102 the desired signal 110 is present, together with the undesired signals 111 and 112. The undesired optical leakage illustrated by signal 112 whether or not combined with reflections of transmitted signals illustrated by signal 111, produces an optical beat interference (OBI) effect at the photodiode 102. It should be further understood that this effect may also be present at the photodiode 105. The OBI further produces an increase in the noise floor at the receiver which reduces the performance of the PON 150 as a whole.

Figure 2:
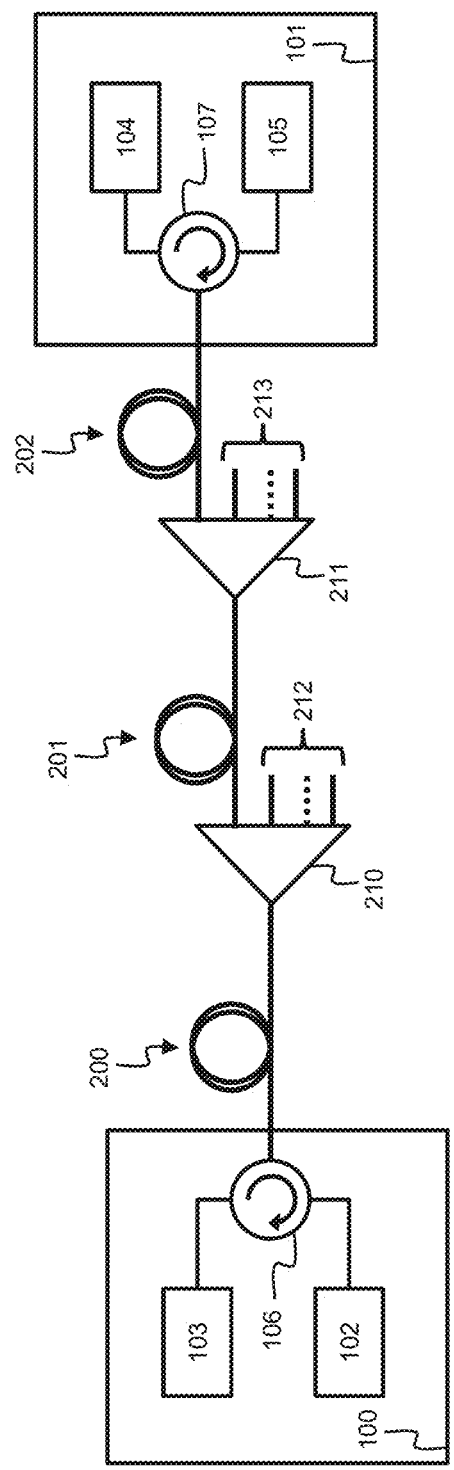
FIG. 2 shows another example embodiment of a passive optical network comprising an optical line terminal and an optical network terminal further comprising a plurality of optical splitters.

Furthermore, to increase in a very convenient way fiber optic capacity, a PON may further comprises a multitude of ONTs served by the OLT 100. In FIG. 2 such a PON is illustrated whereby the OLT 100 and the ONT 101 are likewise represented. Between the OLT 100 and the ONT 101, and in particular in the fiber 109, splitters 210 and 211 are presented. The length between the splitters 210 and 211, between the splitter 210 and the OLT 100, and between the splitter 211 and the ONT 101 may also be several kilometres. This is illustrated by loops 200, 201, and 202.

The splitters 210 and 211 are configured such that additional ONTs may be served by the OLT 100. Splitter 210 comprises connections 212 configured to serve a plurality of ONTs, while splitter 211 comprises connections 213 to serve other more ONTs.

It should be further understood that in a configuration as illustrated by FIG. 2 the OBI effect may also be present. The combination of desired and undesired signals at the receiver 102 may then even be more complicated, due to for example more reflections on different discontinuities, like the optical splitters 210 and 211. Thus, at the photodiode 102 all these optical signals are combined leading to the production of the OBI effect.

Figure 3:
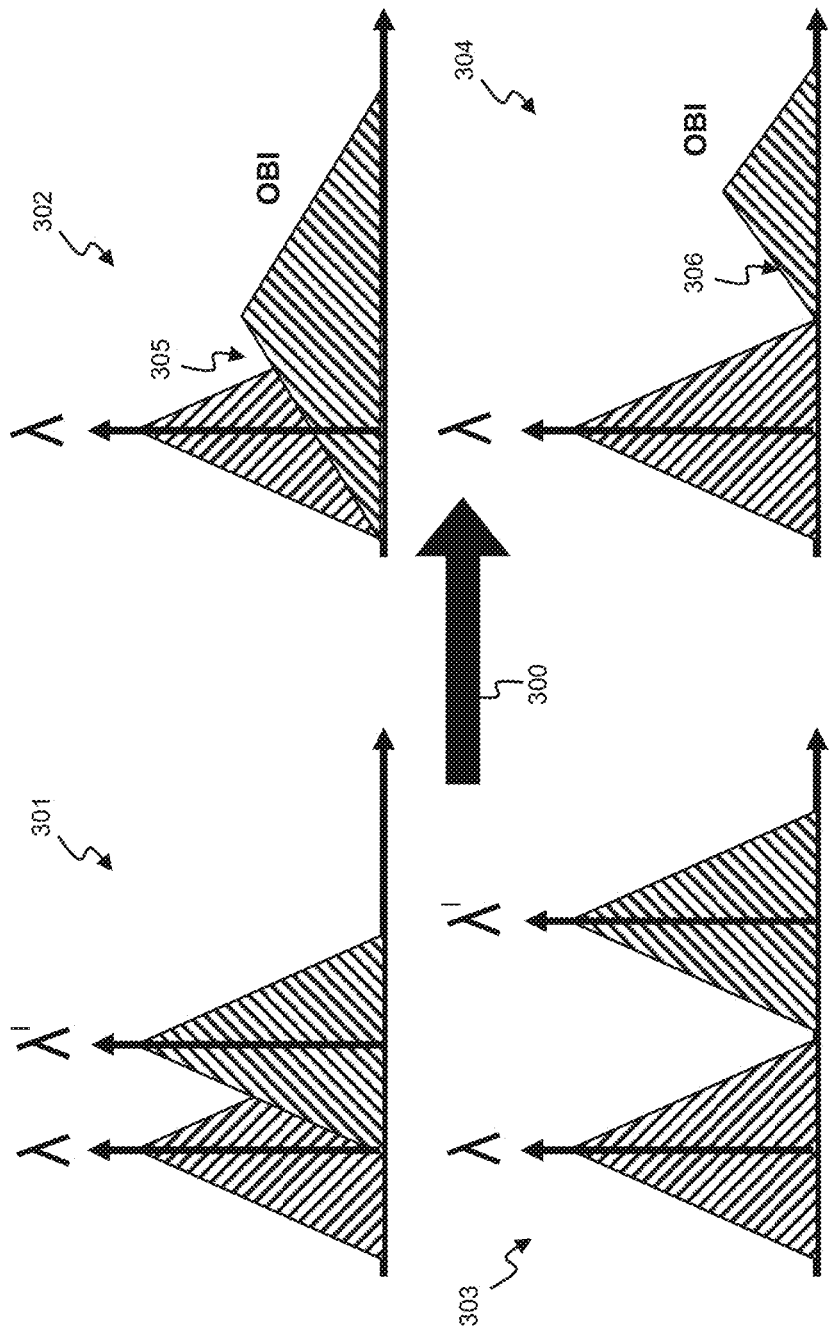
FIG. 3 shows an effect of separating wavelengths in a passive optical network.

The OBI effect is further illustrated in FIG. 3. At a random spectral location 301 of receiving, with wavelength λ, and transmitting, with wavelength λ', lasers that are very close, the OBI is produced by the fact that a detecting photodiode is performing an equivalent quadratic function. The quadratic function causes a beat of the two optical signals, yielding an electrical component that relates to the wavelength difference between the transmitting λ' and the receiving λ wavelengths. The closer 301 the two wavelengths, the higher 305 the amount of interference 302 that is produced at the receiver. When the two wavelengths are further away from each other 303, the smaller 306 the OBI effect 304 will be.

Figure 4:
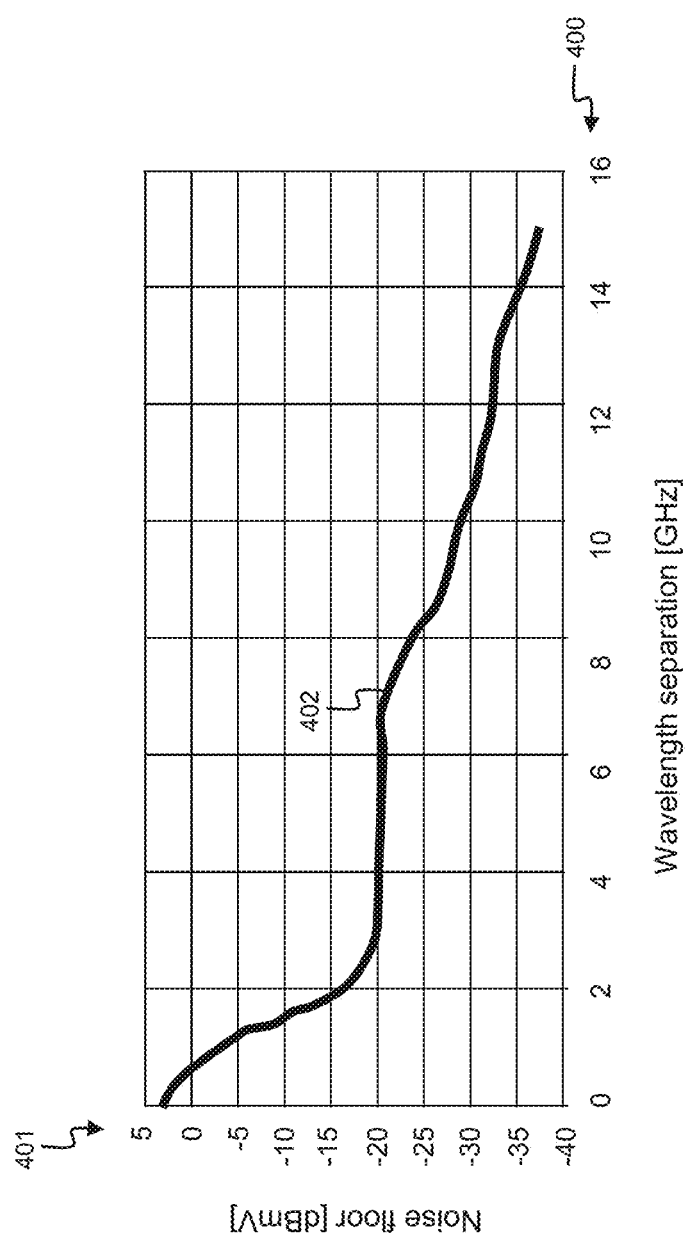
FIG. 4 shows an effect of wavelength separation versus a noise floor in an optical passive network.

The same observation is further illustrated in FIG. 4. In FIG. 4 the wavelength separation, expressed in GHz 400, is plotted 402 against the noise floor, expressed in dBmV 401. As illustrated in FIG. 4 the OBI effect represented by the noise floor 401 is less when the wavelength separation increases.

Figure 5:
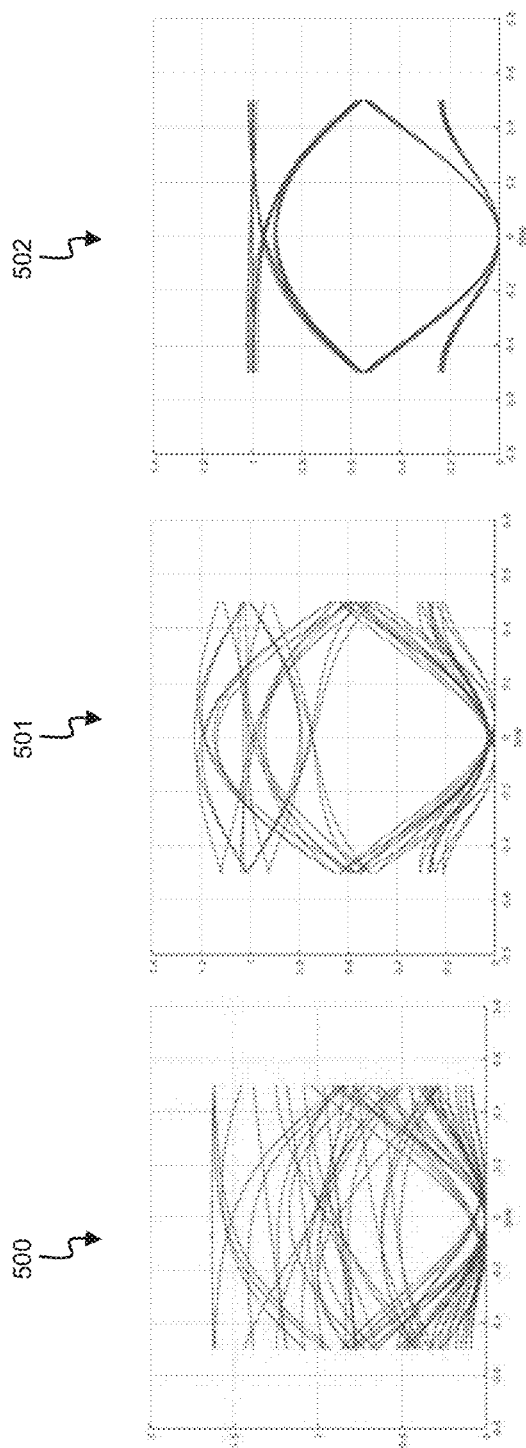
FIG. 5 shows an impact of optical beat interference on eye patterns for different wavelength push values.

The same OBI effect can also be seen in the time domain by means of eye patterns as illustrated in FIG. 5. For a small wavelength separation like, for example, 0.01 nm 500 the eye pattern shows that the signal is not usable 500, while pushing the wavelength to 0.4 nm 502 the quality of the signal is equivalent to not having OBI at all. The eye pattern 501 illustrates a wavelength difference of 0.1 nm.

Figure 6:
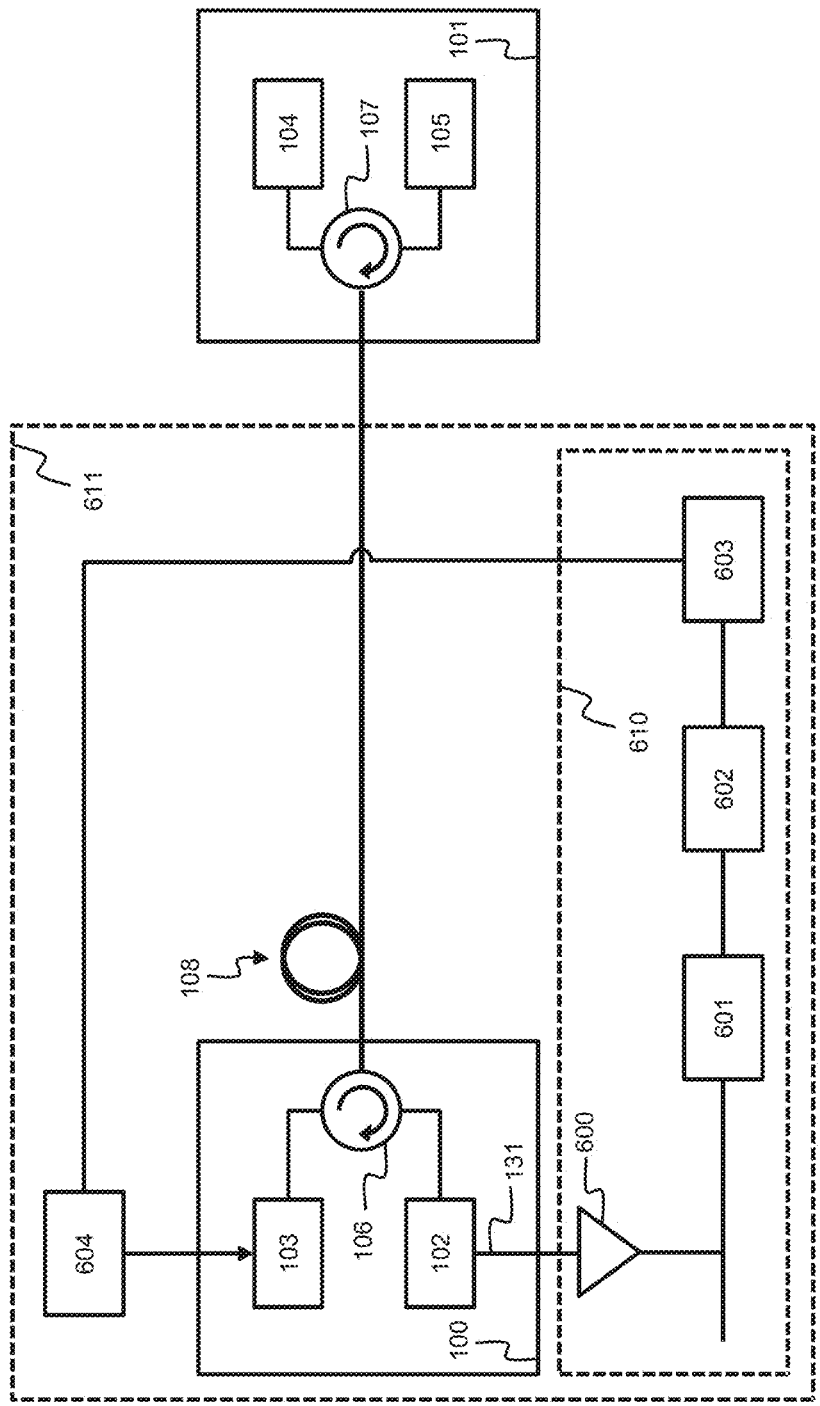
FIG. 6 show an example embodiment of a control loop for shifting wavelengths in a passive optical network comprising an optical line terminal and an optical network terminal.

The OBI effect is reduced, according to an embodiment, by a loop that controls a transmitting laser bias. FIG. 6 illustrates such a loop 610 comprising components 600-603 controlling a transmitting laser bias 604 in a PON comprising an OLT 611 and an ONT 101. The transmitting laser bias 604 controls the transmitting laser 103 such that the transmitting optical wavelength λ' is kept in a certain difference with respect to the receiving wavelength λ, received at the photodiode 102. This in turn produces a shift to the OBI spectrum to a frequency position wherein it may be filtered out and therefore reducing the impact on the received signal quality.

Figure 9:
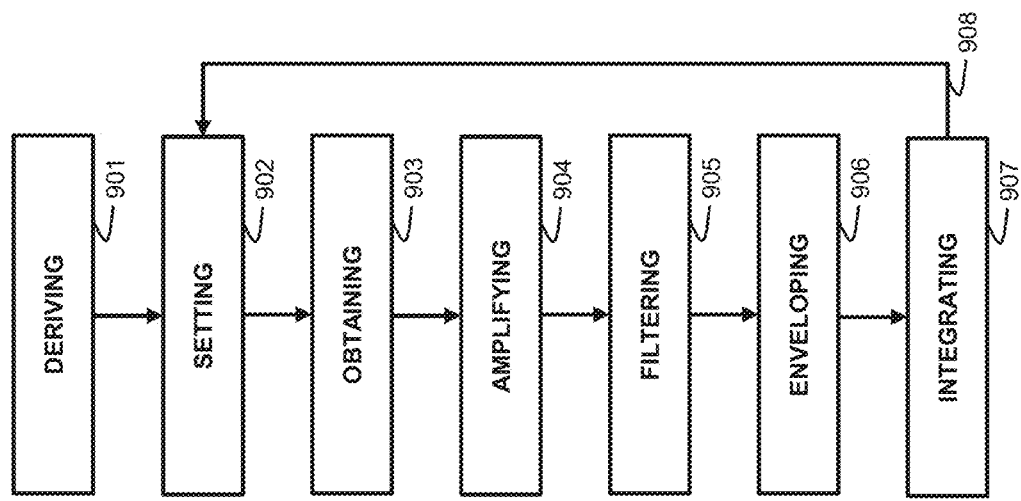
FIG. 9 shows several steps performed in embodiments of the disclosure.

The wavelength push has to be high enough to reduce the OBI, while simultaneously low enough for not forcing the transmitting laser 103 to operate at current stress. To meet these requirements, the steps performed to push the wavelength will now further be illustrated with reference to FIG. 9 combined with reference to FIG. 6.

In FIG. 6 the illustrated case relates to a 25 Gbps case, wherein the transmitting is performed at 50 Gbps by the use of 25 Gbps components in in-band full duplex mode. The wavelength separation is performed by the loop 610. Initially, the laser bias 604 is set to its maximum or minimum position at start-up. Next, the received signal at the photodiode 102 which comprises the desired signal as well as spurious undesired signals is monitored by deriving 901 therefrom the level of OBI. As highlighted, the setting 902 is initially performed by setting the laser bias 604 to its maximum or minimum position at start-up. Next, a signal 131 representative for the signal received by the photodiode 103 is obtained 903. This signal 131 is amplified 904 by an amplifier 600, for example a transconductance amplifier. Subsequently, the result is filtered 905 by a high-pass filter 601 to take most of the OBI signal. Then an electrical envelope detector 602 detects 906 the envelope of the signal and an integrator 603 or low pass filter determines by integrating 907 the amount of OBI energy present. Preferably, this value is high since this means that the OBI has been shifted to the upper part of the spectrum where it is more innocuous. The OBI energy value is then used to control the laser bias 604 by setting 902 it in such a way that it produces a shift in the wavelength.

Figure 7:
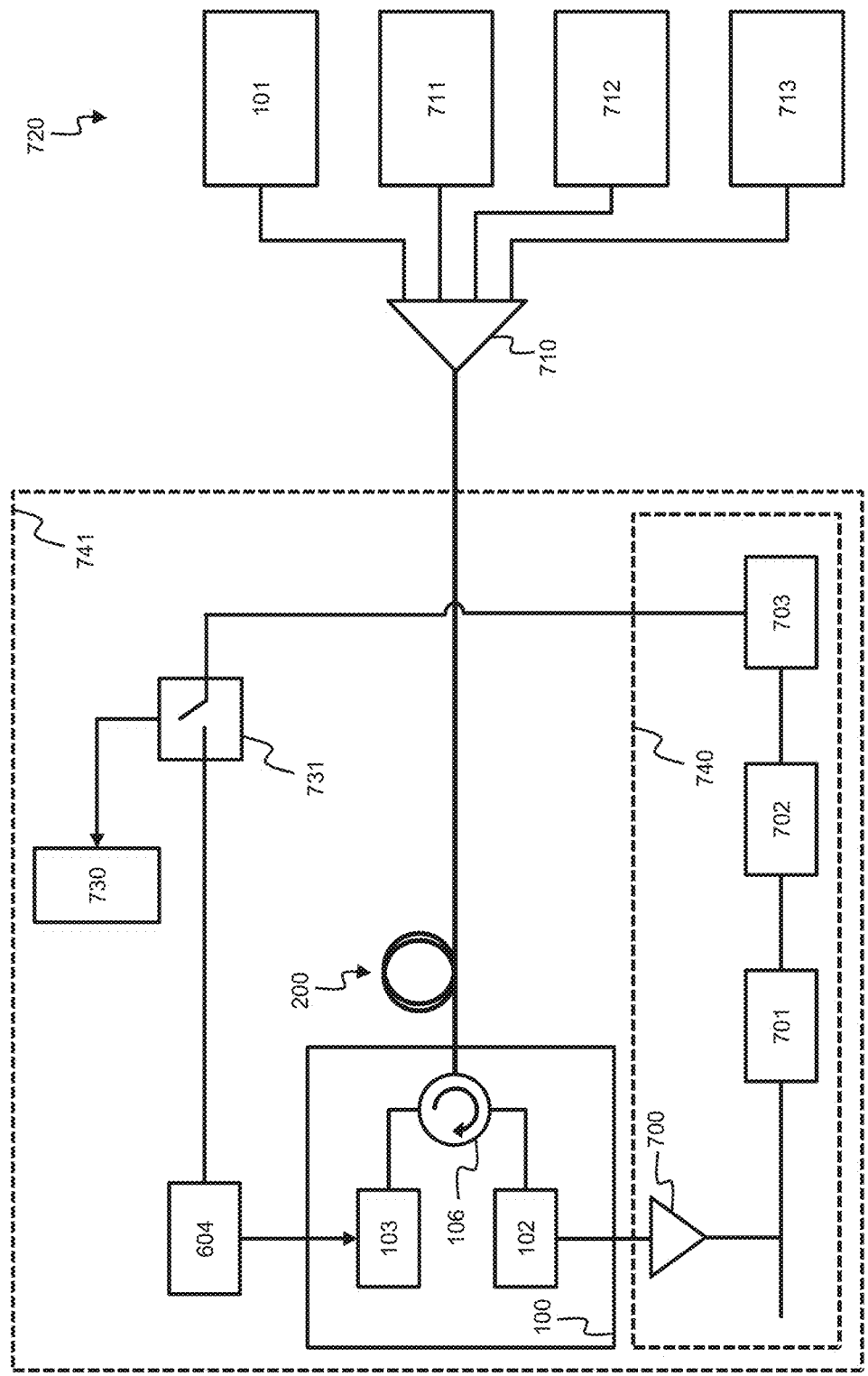
FIG. 7 show an example embodiment of a control loop for shifting wavelengths in a passive optical network comprising an optical line terminal and a plurality of optical network terminals.

A similar loop 610 can likewise be implemented in a PON comprising a point-to-multipoint system as illustrated in FIG. 7. In the illustrative embodiment of FIG. 7 a plurality of ONTs 101, 711-713 are present and connected via the splitter 710 to the same optical fiber with loop 200.

An approach for initialization of the circuitry 740 combined with a switch 731, a storage medium 730, and the laser bias 604 will now be further discussed. At the early ONTs 101, 711-713 connection phase and without data being transmitted, a continuous optical wave may be transmitted from each of the transmission ends 101, 711-713 sequentially. In a first step, the OLT 741 or infrastructure side transmits a continuous optical wave to the first PON termination, this is ONT 101, and ONT 101 transmits a continuous optical wave to the OLT 741. During this transmission, the loop at the OLT 741 comprising an amplifier 700, a low pass filter 701, an envelope detector 702, and an integrator 703, derives 901 the amount of radio frequency energy received as difference between the wavelengths $\lambda$ and $\lambda'$. This energy value is used to set 902 the laser bias 604 to shift $\lambda'$ to a value that minimize this energy value. The process is repeated for each of the ONTs 101, 711-713 of the active PON terminations, and the laser bias 604 values are stored in the storage medium 730 for further use. The loop can, according to an embodiment, digitally be implemented such that an analogue to digital converter is operating before the values are stored in the storing medium 730. Subsequently, a digital to analogue converter to translate the stored values can be used to transform the values into bias currents or voltages to the laser 103. The loop has a switch 731 to activate the initialization process during a training phase in such a way that the loop is active only during the continuous optical wave transmission phase.

Next, in normal operation, each time that a PON termination 101, 711-713 is addressed for data transmission, the corresponding laser bias value stored in the storing medium 730 is loaded to control the laser 103 frequency at the infrastructure side 741 for this particular ONT.

Since the laser frequencies may experience drift along time in operation, the switch 731 may be closed such that the tracking is continuously performed as illustrated by the control loop of FIG. 6.

Figure 8:
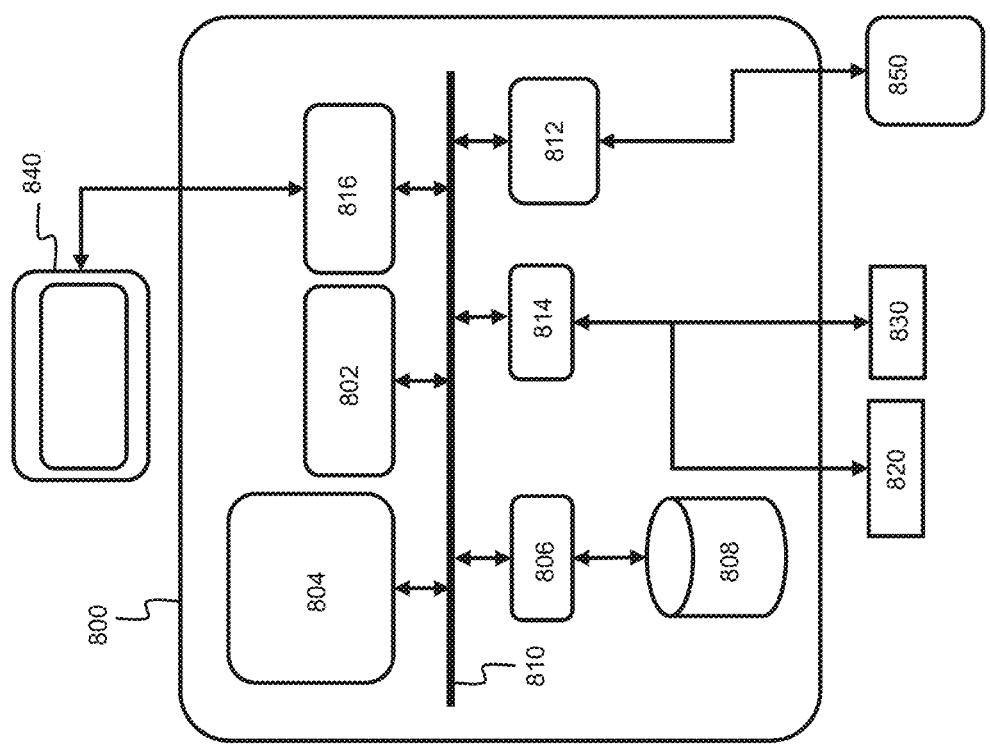
FIG. 8 shows an example embodiment of a suitable computing system for performing one or several steps in embodiments of the disclosure.

FIG. 8 shows a suitable computing system 800 enabling to implement embodiments of the method for controlling an optical transceiver of an optical line terminal 100. Computing system 800 may in general be formed as a suitable general-purpose computer and comprise a bus 810, a processor 802, a local memory 804, one or more optional input interfaces 814, one or more optional output interfaces 816, a communication interface 812, a storage element interface 806, and one or more storage elements 808. Bus 810 may comprise one or more conductors that permit communication among the components of the computing system 800. Processor 802 may include any type of conventional processor or microprocessor that interprets and executes programming instructions. Local memory 804 may include a random-access memory (RAM) or another type of dynamic storage device that stores information and instructions for execution by processor 802 and/or a read only memory (ROM) or another type of static storage device that stores static information and instructions for use by processor 802. Input interface 814 may comprise one or more conventional mechanisms that permit an operator or user to input information to the computing device 800, such as a keyboard 820, a mouse 830, a pen, voice recognition and/or biometric mechanisms, a camera, etc. Output interface 816 may comprise one or more conventional mechanisms that output information to the operator or user, such as a display 840, etc. Communication interface 812 may comprise any transceiver-like mechanism such as for example one or more Ethernet interfaces that enables computing system 800 to communicate with other devices and/or systems, for example with the circuitries 610, 740. The communication interface 812 of computing system 800 may be connected to such another computing system by means of a local area network (LAN) or a wide area network (WAN) such as for example the internet. Storage element interface 806 may comprise a storage interface such as for example a Serial Advanced Technology Attachment (SATA) interface or a Small Computer System Interface (SCSI) for connecting bus 810 to one or more storage elements 808, such as one or more local disks, for example SATA disk drives, and control the reading and writing of data to and/or from these storage elements 808. Although the storage element(s) 808 above is/are described as a local disk, in general any other suitable computer-readable media such as a removable magnetic disk, optical storage media such as a CD or DVD, -ROM disk, solid state drives, flash memory cards, . . . could be used. Computing system 800 could thus correspond to the controller circuitry 610 or 740 in the embodiments illustrated by FIG. 6 or FIG. 7.

As used in this application, the term "circuitry" may refer to one or more or all of the following:

(a) hardware-only circuit implementations such as implementations in only analog and/or digital circuitry and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A controller circuitry configured to control an optical transceiver of an optical line terminal, OLT, in a passive optical network, PON, the controller circuitry configured to:
   derive a level of optical beat interference, OBI, of a received optical signal including an upstream optical signal from an optical transceiver of an optical network terminal, ONT; and
   set a wavelength of a downstream optical signal,
   wherein the wavelength of the downstream optical signal is set such that the wavelength of the downstream optical signal and a wavelength of the upstream optical differ and the difference between the wavelength of the downstream optical signal and the wavelength of the upstream optical signal is based on the derived level of the OBI.

2. The controller circuitry according to claim 1, wherein the controller circuitry is further configured to:
   obtain a monitored signal indicative of the received upstream optical signal;
   and wherein in the deriving the level of the OBI the controller circuitry is configured to:
   amplify the monitored signal to obtain an amplified signal; and
   filter the amplified signal to obtain a filtered signal;
   envelop the filtered signal to obtain an enveloped signal; and
   integrate the enveloped signal to obtain an integrated signal, wherein the integrated signal is indicative for the level of the OBI.

3. The controller circuitry according to claim 2, wherein the controller circuitry is configured to:
   instruct a transmitting laser of the optical transceiver of the OLT to produce an initializing optical signal configured to instruct the optical transceiver of the ONT to send in reply a responding optical signal; and
   wherein the monitored signal is the responding optical signal.

4. The controller circuitry according to claim 3, wherein the initializing optical signal is further configured to instruct a plurality of optical transceivers of ONTs to sequentially send in reply a respective responding optical signal; and
   the controller circuitry is configured to perform the deriving by deriving the level of the OBI based on a maximum value of the respective responding optical signals.

5. The controller circuitry according to claim 3, wherein the initializing optical signal is further configured to instruct a plurality of optical transceivers of ONTs to sequentially send a respective responding optical signal in reply; and
   the controller circuitry is configured to perform the deriving by sequentially deriving the level of the OBI for the respective responding optical signals; and
   wherein the controller circuitry is configured to store for the plurality of ONTs the respective level of the OBI.

6. The controller circuitry according to claim 5, wherein the controller circuitry is configured to:
   identify an ONT as addressee and based thereon selecting the corresponding stored level of the OBI;
   and wherein the setting is based on the selected level of the OBI.

7. The controller circuitry according to claim 2, wherein the controller circuitry is configured to:
   instruct a laser bias configured to control a transmitting laser for producing the downstream optical signal at the optical transceiver of the OLT; and wherein the setting further comprises the instructing the laser bias.

8. The optical line terminal, OLT, comprising the controller circuitry according to claim 1.

9. The OLT according to claim 8, further comprising:
   a laser bias and transmitting laser; and wherein the controller circuitry is further configured to instruct the laser bias configured to control the transmitting laser for producing the downstream optical signal at the optical transceiver of the OLT; and wherein the setting further comprises instructing the laser bias.

10. A method of operating an optical line terminal, OLT, the method comprising:
    deriving a level of optical beat interference, OBI, of a received optical signal including an upstream optical signal from an optical transceiver of an optical network terminal, ONT; and
    setting a wavelength of a downstream optical signal,
    wherein the wavelength of the downstream optical signal is set such that the wavelength of the downstream optical signal and a wavelength of the upstream optical differ and the difference between the wavelength of the downstream optical signal and the wavelength of the upstream optical signal is based on the derived level of the OBI.

11. The method according to claim 10, further comprising:
    obtaining a monitored signal indicative for the received upstream optical signal; and wherein the deriving of the level of the OBI includes,
    amplifying the monitored signal to obtain an amplified signal; and
    filtering the amplified signal to obtain a filtered signal;
    enveloping the filtered signal to obtain an enveloped signal; and
    integrating the enveloped signal to obtain an integrated signal, the integrated signal being indicative for the level of the OBI.

12. A computing system configured to control an optical line terminal, OLT, the computing system comprising:
    computer readable storage medium storing computer-executable instructions; and a processor configured to interpret and execute the computer-executable instructions, which when executed by the processor causes the computing system to derive a level of optical beat interference, OBI, of a received optical signal including an upstream optical signal from an optical transceiver of an optical network terminal, ONT; and set a wavelength of a downstream optical signal, wherein the wavelength of the downstream optical signal is set such that the wavelength of the downstream optical signal and a wavelength of the upstream optical signal differ and the difference between the wavelength of the downstream optical signal and the wavelength of the upstream optical signal is based on the derived level of the OBI.

* * * * *